United States Patent
Chen et al.

(10) Patent No.: US 9,929,675 B2
(45) Date of Patent: Mar. 27, 2018

(54) INVERTER APPARATUS CAPABLE OF CONTROLLING BURST MODE OPERATION AND CONTROL METHOD THEREOF

(71) Applicant: FSP TECHNOLOGY INC., Taoyuan (TW)

(72) Inventors: Han-Wei Chen, Taoyuan (TW); Chun-Hao Yu, Taoyuan (TW); Chia-Hua Liu, Taoyuan (TW)

(73) Assignee: FSP TECHNOLOGY INC., Taoyuan (TW)

( * ) Notice: Subject to any disclaimer, the term of this patent is extended or adjusted under 35 U.S.C. 154(b) by 203 days.

(21) Appl. No.: 14/630,658

(22) Filed: Feb. 25, 2015

(65) Prior Publication Data

US 2015/0244247 A1    Aug. 27, 2015

Related U.S. Application Data

(60) Provisional application No. 61/944,587, filed on Feb. 26, 2014.

(30) Foreign Application Priority Data

Feb. 5, 2015   (TW) .............................. 104103964 A (51) Int. Cl.
    *H02M 3/335*    (2006.01)
    *H02M 7/48*     (2007.01)
    (Continued)

(52) U.S. Cl.
    CPC .......... *H02M 7/4826* (2013.01); *H02J 3/383* (2013.01); *H02M 3/33507* (2013.01);
    (Continued)

(58) Field of Classification Search
    CPC . H02M 2007/4818; H02M 2007/4815; H02M 2001/0058; H02M 3/005;
    (Continued)

(56) References Cited

U.S. PATENT DOCUMENTS

2009/0086517 A1*  4/2009  Wei ...................... H02M 3/156
                                                                363/50
2013/0293211 A1* 11/2013  Chen ................... H02M 3/1588
                                                               323/282

(Continued)

*Primary Examiner* — Timothy J Dole
*Assistant Examiner* — Bryan R Perez
(74) *Attorney, Agent, or Firm* — Winston Hsu (57) ABSTRACT

An inverter apparatus is provided. The inverter apparatus includes a direct current to direct current (DC/DC) converter, a direct current to alternating current (DC/AC) converter and a control circuit. The DC/DC converter is arranged for converting an input power to a DC power according to a control signal. The DC/AC converter is coupled to the DC/DC converter, and is arranged for receiving the DC power, and generating an AC power according to the DC power. The control circuit is coupled to the DC/DC converter, and is arranged for generating the control signal according to a reference power and the input power so as to control an operation of the DC/DC converter, detecting the control signal to generate a detection result, and controlling the reference power according to the detection result so as to adjust a duty cycle of the control signal.

14 Claims, 5 Drawing Sheets

(51) Int. Cl.
*H02J 3/38* (2006.01)
*H02M 1/00* (2006.01)

(52) U.S. Cl.
CPC .............. *H02M 2001/007* (2013.01); *H02M 2001/0035* (2013.01); *H02M 2001/0058* (2013.01); *H02M 2007/4815* (2013.01); *Y02B 70/1491* (2013.01); *Y02B 70/16* (2013.01); *Y02E 10/563* (2013.01)

(58) Field of Classification Search
CPC .......... H02M 2003/1557; H02M 3/156; Y02B 70/1425; Y02B 70/1491
USPC ..... 363/97, 98, 131, 132; 323/280–285, 299
See application file for complete search history.

(56) References Cited

U.S. PATENT DOCUMENTS

| | | | | |
|---|---|---|---|---|
| 2013/0314949 | A1* | 11/2013 | Chi | H02M 1/32 363/17 |
| 2014/0077785 | A1* | 3/2014 | Jiang | G05F 5/00 323/299 |
| 2014/0334190 | A1* | 11/2014 | Zhang | H02M 3/33507 363/17 |

* cited by examiner

INVERTER APPARATUS CAPABLE OF CONTROLLING BURST MODE OPERATION AND CONTROL METHOD THEREOF

CROSS REFERENCE TO RELATED APPLICATIONS

This application claims the benefit of U.S. provisional application No. 61/944,587, filed on Feb. 26, 2014, the contents of which are incorporated herein by reference.

BACKGROUND OF THE INVENTION

1. Field of the Invention

The disclosed embodiments of the present invention relate to an inverter apparatus, and more particularly, to an inverter apparatus capable of detecting an operating status of a primary-side conversion circuit to adaptively adjust a primary-side control signal, and a related control method.

2. Description of the Prior Art

A photovoltaic inverter (PV inverter) converts a direct current (DC) power outputted from a photovoltaic panel (PV panel) to an alternating current (AC) power, and outputs the AC power to a grid. When solar power is insufficient, a primary-side conversion circuit of the PV inverter operates in a deep burst mode. In one example, the primary-side conversion circuit enters the deep burst mode when an output power of the PV panel is too low. In another example, when illuminance is reduced greatly, the PV panel operates at a low voltage and has a low energy output, causing the primary-side conversion circuit to enter the deep burst mode.

However, when the primary-side conversion circuit operates in the deep burst mode, internal circuitry of the PV inverter operates abnormally or stops operating due to insufficient power supplied by the primary-side conversion circuit. This causes damage to circuit elements of the PV inverter.

Thus, a novel detection scheme for a PV inverter is needed to avoid side effects caused by the burst mode.

SUMMARY OF THE INVENTION

It is therefore one objective of the present invention to provide an inverter apparatus capable of detecting an operating status of a primary-side conversion circuit to adaptively adjust a primary-side control signal, and a related control method to solve the above problems.

According to an embodiment of the present invention, an exemplary inverter apparatus is disclosed. The exemplary inverter apparatus comprises a direct current to direct current (DC/DC) converter, a direct current to alternating current (DC/AC) converter and a control circuit. The DC/DC converter is arranged for converting an input power to a DC power according to a control signal. The DC/AC converter is coupled to the DC/DC converter, and is arranged for receiving the DC power, and generating an AC power according to the DC power. The control circuit us coupled to the DC/DC converter, and is arranged for generating the control signal according to a reference power and the input power so as to control an operation of the DC/DC converter, detecting the control signal to generate a detection result, and controlling the reference power according to the detection result so as to adjust a duty cycle of the control signal.

According to an embodiment of the present invention, an exemplary control method for an inverter apparatus is disclosed. The inverter apparatus comprises a direct current to direct current (DC/DC) converter and a direct current to alternating current (DC/AC) converter. The DC/DC converter converts an input power to a DC power. The DC/AC converter converts the DC power to an AC power. The control method comprises the following step: generating a control signal according to a reference power and the input power so as to control an operation of the DC/DC converter; detecting the control signal to generate a detection result; and controlling the reference power according to the detection result so as to adjust a duty cycle of the control signal.

The proposed inverter apparatus may obtain/monitor an operating status by detecting a control signal of a primary-side conversion circuit, and adaptively adjust a signal level and/or a duty cycle of the control signal. Hence, the proposed inverter apparatus may maintain a stable operation in a burst mode and can be used in a variety of power conversion schemes.

These and other objectives of the present invention will no doubt become obvious to those of ordinary skill in the art after reading the following detailed description of the preferred embodiment that is illustrated in the various figures and drawings.

DETAILED DESCRIPTION

The proposed inverter architecture may detect a control signal of a primary-side conversion circuit to monitor an operating status of the primary-side conversion circuit, and adaptively adjust a duty cycle of the control signal according to a detection result, thus greatly increasing flexibility of controlling an inverter and providing robust circuit protection scheme. To facilitating an understanding of the present invention, the proposed inverter apparatus is implemented by a photovoltaic inverter (PV inverter) in the following. However, the proposed inverter architecture is not limited to being implemented as a PV inverter. Further description is provided below.

Figure 1:
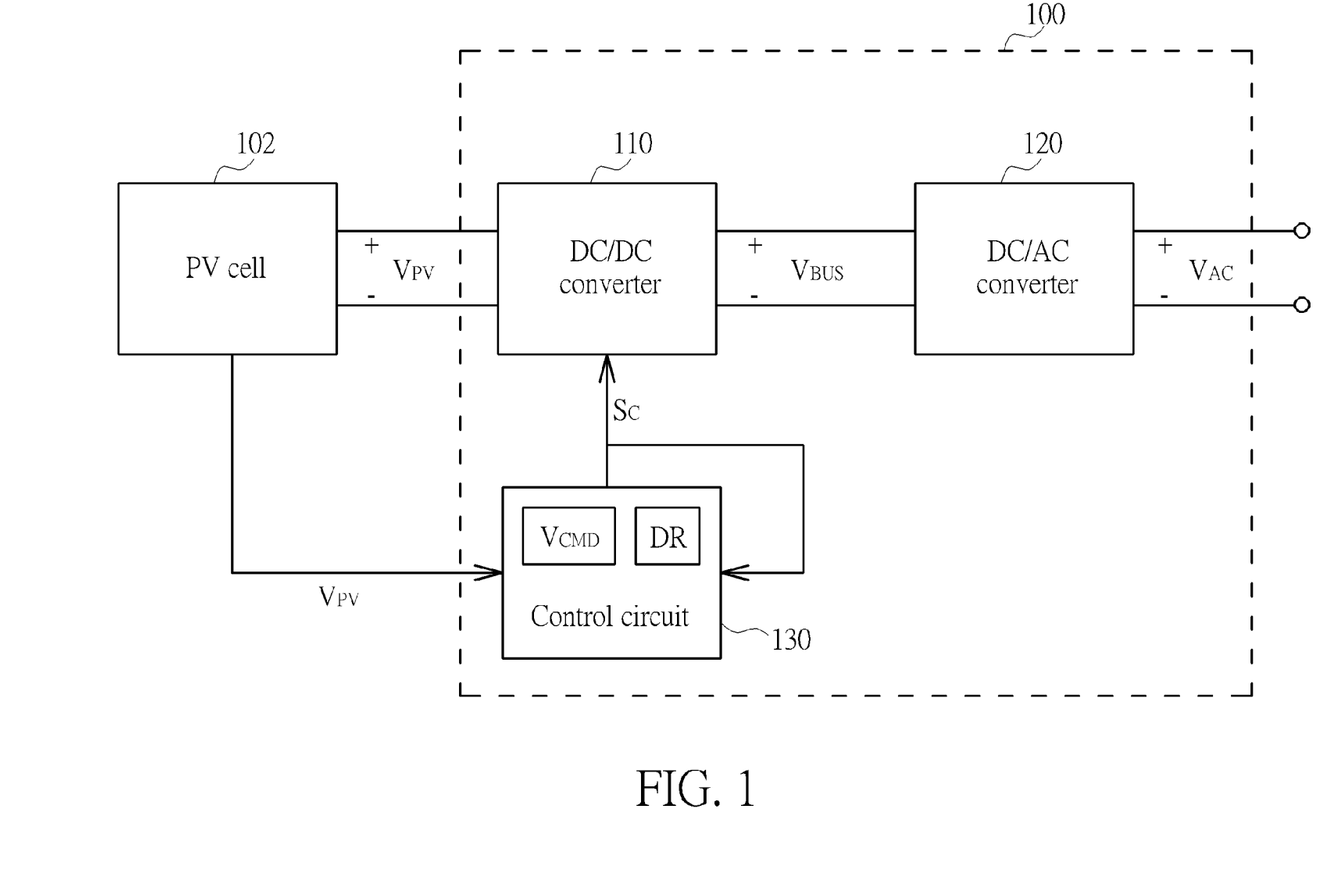
FIG. 1 is a block diagram illustrating an exemplary inverter apparatus according to an embodiment of the present invention.

Please refer to FIG. 1, which is a block diagram illustrating an exemplary inverter apparatus according to an embodiment of the present invention. The inverter apparatus 100 is coupled to a photovoltaic cell (PV cell) 102, and may include, but is not limited to, a direct current to direct current (DC/DC) converter 110, a direct current to alternating current (DC/AC) converter 120 and a control circuit 130. The DC/DC converter 110 may receive an input power $V_{PV}$ provided by the PV cell 102, and convert the input power $V_{PV}$ to a DC power $V_{BUS}$ (e.g. a DC bus voltage) according to a control signal $S_C$. The DC/AC converter 120 is coupled to the DC/DC converter 110, and is arranged for receiving the DC power $V_{BUS}$, and generating an AC power $V_{AC}$ according to the DC power $V_{BUS}$. In one implementation, the DC/DC converter 110 may be implemented by an LLC resonant converter, which may provide soft switching to increase conversion efficiency and reduce electromagnetic interference (EMI). Additionally, the DC/AC converter 120 may be referred to as a DC/AC inverter.

The control circuit 130 is coupled to the DC/DC converter 110, and is arranged for generating the control signal $S_C$ according to a reference power $V_{CMD}$ and the input power $V_{PV}$ so as to control an operation of the DC/DC converter 110. By way of example but not limitation, the control circuit 130 may compare the reference power $V_{CMD}$ with the input power $V_{PV}$ to generate the control signal $S_C$, thereby controlling an operating frequency and an operating status (e.g. a normal mode or a burst mode) of the DC/DC converter 110. In another example, the control circuit 130 may perform numerical computation on the reference power $V_{CMD}$ with the input power $V_{PV}$ to generate the control signal $S_C$.

Figure 2:
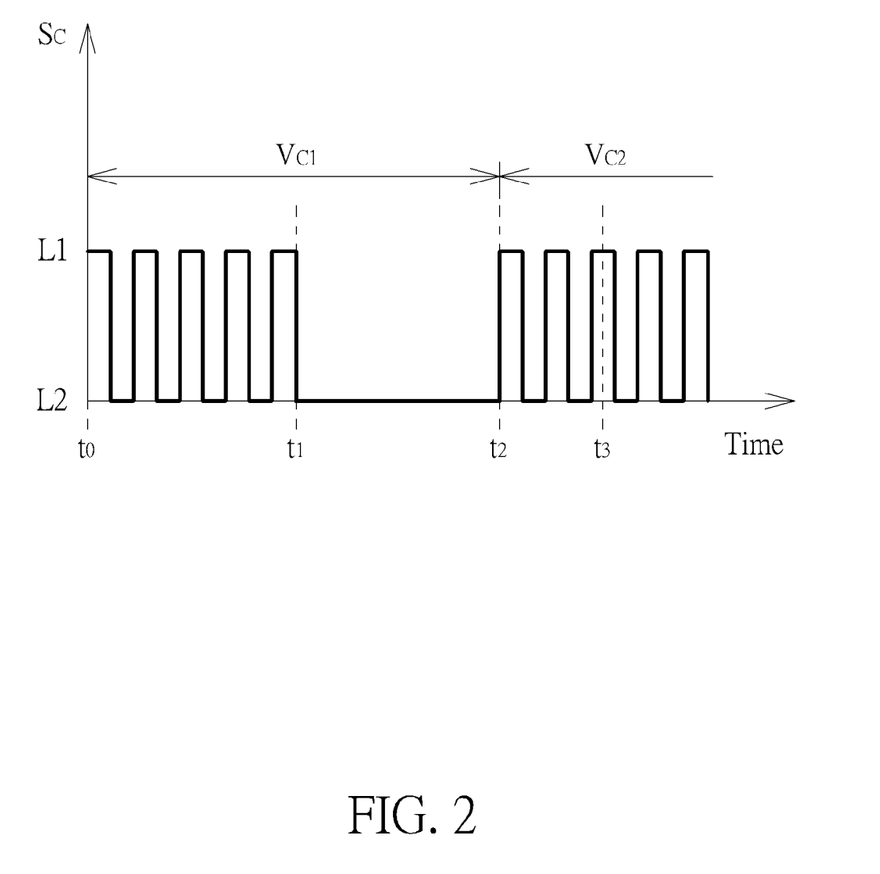
FIG. 2 is a waveform diagram illustrating a waveform of the control signal shown in FIG. 1 according to an embodiment of the present invention.

In order to monitor a real-time operating status of the inverter 100, the control circuit 130 may further process/detect the control signal $S_C$ to generate a detection result DR, and control the reference power $V_{CMD}$ according to the detection result DR to thereby adjust the control signal $S_C$ used for controlling the DC/DC converter 110. Please refer to FIG. 2 in conjunction with FIG. 1. FIG. 2 is a waveform diagram illustrating a waveform of the control signal $S_C$ shown in FIG. 1 according to an embodiment of the present invention. In this embodiment, the control signal $S_C$ may have a first level L1 and a second level L2 different from the first level L1. When the control signal $S_C$ continuously stays at the second level L2, the DC/DC converter 110 stops power conversion (i.e. operating in a burst mode). Hence, in a case where a signal level of the control signal $S_C$ can be changed by adjusting the reference power $V_{CMD}$, the control circuit 130 may adjust an energy level of the reference power $V_{CMD}$ according to the detection result DR to thereby switch the signal level of the control signal $S_C$. Hence, the control circuit 130 may adjust the operation of the DC/DC converter 110 in the burst mode in real-time to avoid an abnormal operation of the DC/DC converter 110.

In one implementation, the control circuit 130 may control the reference power $V_{CMD}$ according to the detection result DR so as to adjust a duty cycle of the control signal $S_C$, and accordingly control the operation of the DC/DC converter 110 in the burst mode. In this implementation, the DC/DC converter 110 may operate in the burst mode according to the control signal $S_C$ at a point in time $t_1$, wherein the DC/DC converter 110 turns on during a time interval between a point in time $t_0$ and the point in time $t_1$, and turns off during a time interval between the point in time $t_1$ to a point in time $t_2$. Additionally, as the DC/DC converter 110 may operate abnormally (e.g. under an abnormal power supply condition) if staying turned off too long, the control circuit 130 may detect a duration during which the control signal $S_C$ continuously stays turned off to generate the detection result DR.

In the burst mode, the control circuit 130 is originally supposed to turn on the DC/DC converter 110 at a point in time $t_3$. However, as a time interval between the points in time $t_1$ and $t_3$ is longer than a specific period of time (equal to the time interval between the points in time $t_1$ and $t_2$ in this embodiment), this will cause the DC/DC converter 110 to operate under the abnormal power supply condition before the point in time $t_3$. Hence, when the detection result DR indicates that the duration during which the DC/DC converter 110 continuously stays turned off is longer than the specific period of time (i.e. the control signal $S_C$ continuously stays at the second level L2 over the specific period of time), the control circuit 130 may adjust a voltage level $V_{C1}$ of the reference power $V_{CMD}$ to a voltage level $V_{C2}$, causing the control signal $S_C$ to be switched to the first level L1 in advance at the point in time $t_2$. In addition, the DC/DC converter 110 may turn on in advance at the point in time $t_2$. In other words, the control circuit 130 may change the duty cycle of the control signal $S_C$ by adjusting the voltage level $V_{C1}$ of the reference power $V_{CMD}$, thereby achieving the objective of controlling the timing of activation and deactivation of the DC/DC converter 110 in the burst mode.

To facilitate an understanding of the present invention, an exemplary implementation is given in the following for further description of the proposed inverter apparatus. It should be noted that other circuit implementations employing the architecture shown in FIG. 1 are feasible. Please refer to FIG. 3, which is an implementation of the inverter apparatus 100 shown in FIG. 1. In this implementation, the inverter apparatus 300 may include the DC/AC converter 120 shown in FIG. 1, a DC/DC converter 310 and a control circuit 330. The DC/DC converter 110 and the control circuit 130 may be implemented by the DC/DC converter 310 and the control circuit 330 respectively. The control circuit 330 may include a controller 332 and a processing circuit 336, wherein the controller 332 may detect the control signal $S_C$ to generate the detection result DR, and generate/control the reference power $V_{CMD}$ according to the detection result DR. The processing circuit 336 may generate the control signal $S_C$ according to the reference power $V_{CMD}$ and the input power $V_{PV}$. The DC/DC converter 310 may include, but is not limited to, an LLC resonant converter 322 and a driver circuit 326. The driver circuit 326 may generate a drive signal $S_D$ according to the control signal $S_C$ generated from the control circuit 330, and the LLC resonant converter 322 may convert the input power $V_{PV}$ to the DC power $V_{BUS}$ according to the driver signal $S_D$.

In this implementation, the LLC resonant converter 322 may include a left arm switch and a right arm switch (not shown in FIG. 3), wherein each of the left arm switch and the right arm switch may include an upper switch and a lower switch. Respective control signals of the upper switch and the lower switch of the left arm switch are complementary, and respective control signals of the upper switch and the lower switch of the right arm switch are complementary as well. The above is an example of a basic structure of the LLC resonant converter 322. As the aforementioned basic structure is not the main feature of the present invention, further description is omitted here for brevity. In this implementation, the driver signal $S_D$ received by LLC resonant converter 322 may include a left arm driver signal $S_{DL}$ and a right arm driver signal $S_{DR}$, and the control signal $S_C$ generated by the processing circuit 336 may include a left arm control signal $S_{CL}$ and a right arm control signal $S_{CR}$. An implementation associated with detection of the control signal $S_C$ is illustrated in FIG. 4. FIG. 4 is a diagram illustrating a part of circuit elements of the controller 332 shown in FIG. 3 according to an embodiment of the present invention. As shown in FIG. 4, the controller 332 may obtain information associated with the control signal $S_C$ by detecting a voltage $V_C$ stored on a capacitor C, wherein the controller 332 may receive the left arm control signal $S_{CL}$ through a diode $D_L$, a resistor $R_1$ and a resistor $R_2$, and receive the right arm control signal $S_{CR}$ through a diode $D_R$, the resistor $R_1$ and the resistor $R_2$. Please note that the signal capturing architecture shown in FIG. 4 is for illustrative purposed only, and is not meant to be a limitation of the present invention.

The control circuit 330 may compare a voltage level of the input power $V_{PV}$ with a voltage level of the reference power $V_{CMD}$ to generate a comparison result, and generate the control signal $S_C$ (the left arm control signal $S_{CL}$ and the right arm control signal $S_{CR}$) according to the comparison result. For example, the processing circuit 336 may include a comparator (not shown in FIG. 3) used for perform voltage level comparison to generate the comparison result, and the processing circuit 336 may generate the control signal $S_C$ according to the comparison result. In one implementation, the function of the aforementioned comparator may be realized by a control circuit having an operational amplifier, a resistor and a capacitor. By adjusting a frequency, a duty cycle, etc., of the control signal $S_C$, the DC/DC converter 310 (LLC resonant converter 322) may operate in different modes (e.g. a normal mode or a burst mode) in response to different power outputs of the PV panel. Additionally, in order to avoid that the DC/DC converter 310 continuously stays turned off too long such that an abnormal power supply condition occurs, the control circuit 330 may adjust the voltage level of the reference power $V_{CMD}$ according to the detection result DR to thereby adjust the control signal $S_C$ (e.g. adjusting a signal level and/or a duty cycle).

Figure 5:
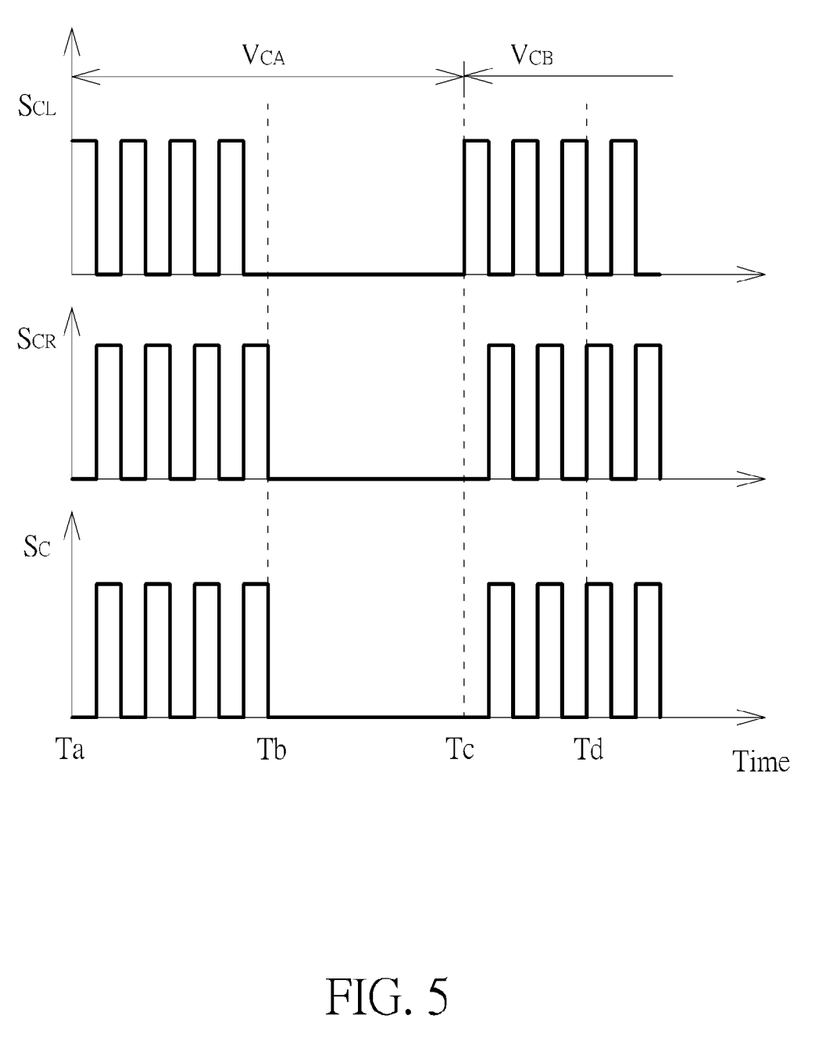
FIG. 5 is a waveform diagram illustrating a waveform of the control signal shown in FIG. 3 according to an embodiment of the present invention.

For example, when the detection result DR indicates that a duration during which the DC/DC converter 310 continuously stays turned off over a specific period of time, the control circuit 330 may reduce the voltage level of the reference power $V_{CMD}$ to adjust the duty cycle of the control signal $S_C$, thus turning on the DC/DC converter 310. Please refer to FIG. 5 in conjunction with FIG. 3. FIG. 5 is a waveform diagram illustrating a waveform of the control signal $S_C$ shown in FIG. 3 according to an embodiment of the present invention. In this implementation, the DC/DC converter 310 turns on during a time interval between a point in time $T_a$ and a point in time $T_b$, and turns off during a time interval between the point in time $T_b$ to a point in time $T_c$. When the DC/DC converter 310 operates in a burst mode according to the control signal $S_C$ (e.g. illuminance is reduced abruptly at the point in time $T_b$), the controller 332 may generate the detection result DR by detecting the duration during which the DC/DC converter 310 stays turned off, and accordingly adjust a voltage level $V_{CA}$ of the reference power $V_{CMD}$. When the detection result DR indicates that the DC/DC converter 310 continuously stays turned off over a specific period of time, the control circuit 330 may reduce the voltage level $V_{CA}$ of the reference power $V_{CMD}$ so as to adjust the control signal $S_C$, wherein the control circuit 330 may reduce the voltage level $V_{CA}$ until the control signal $S_C$ enables the DC/DC converter 310 to turn on (e.g. the point in time $T_c$). As shown in FIG. 5, before the voltage level $V_{CA}$ of the reference power $V_{CMD}$ is reduced to a voltage level $V_{CB}$, the processing circuit 336 is supposed to switch a signal level of the left arm control signal $S_{CL}$ and a signal level of the right arm control signal $S_{CR}$ at the point in time $T_d$. When the voltage level $V_{CA}$ of the reference power $V_{CMD}$ is adjusted to the voltage level $V_{CB}$, the processing circuit 336 may switch the respective signal levels of the left arm control signal $S_{CR}$ and the right arm control signal $S_{CR}$ in advance at the point in time $T_c$, thus preventing the DC/DC converter 310 from continuously staying turned off too long.

The above implementation of adjustment of the control signal $S_C$ is for illustrative purposed only, and is not meant to be a limitation of the present invention. Further, in a case where the DC/DC converter 310 is implemented by other types of power converters, the type/number of control signal (s) received by the DC/DC converter 310 may be adjusted accordingly, and the adjustment of the control signal $S_C$ may also vary.

Figure 3:
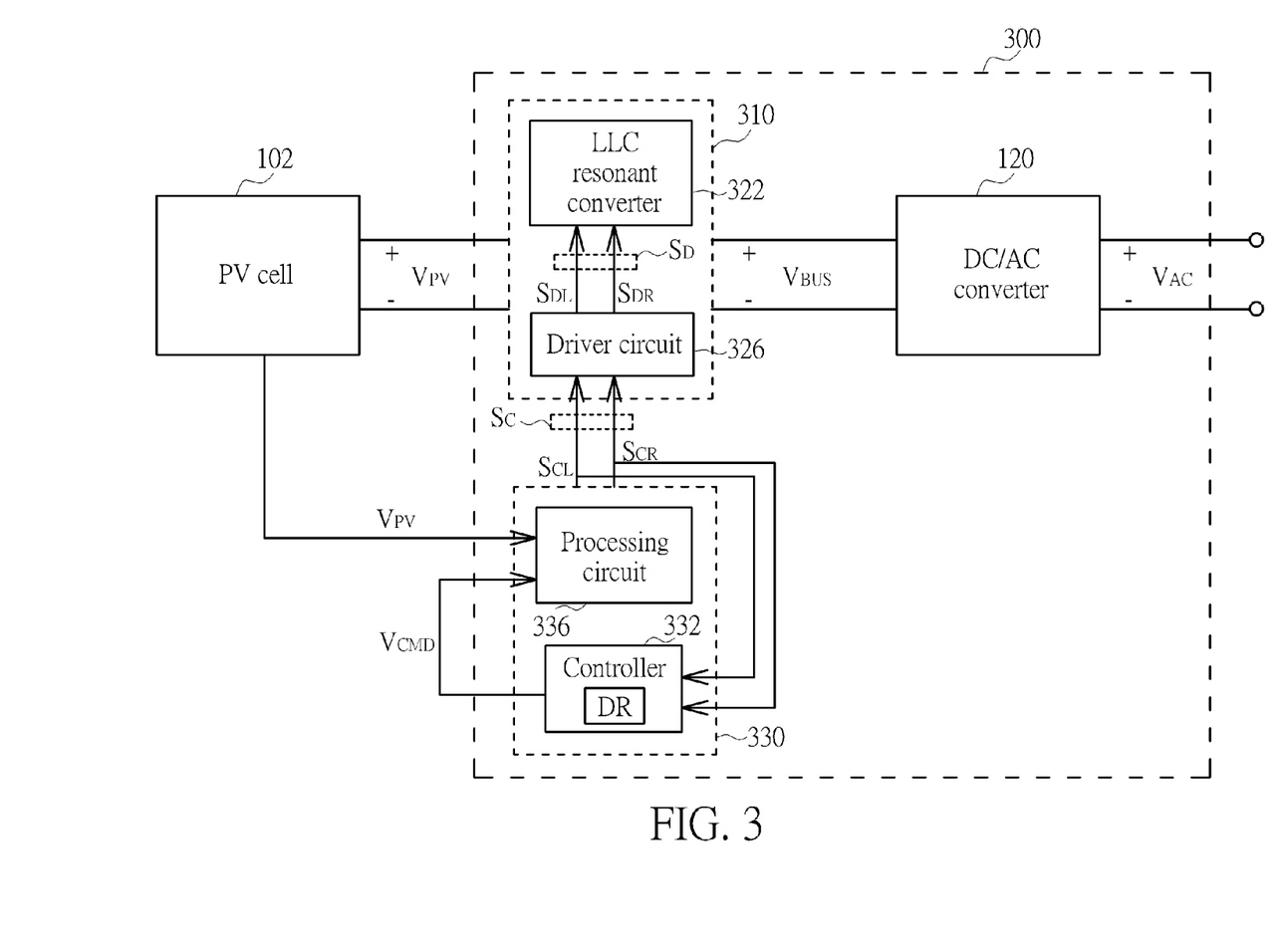
FIG. 3 is an implementation of the inverter apparatus shown in FIG. 1.
Figure 4:
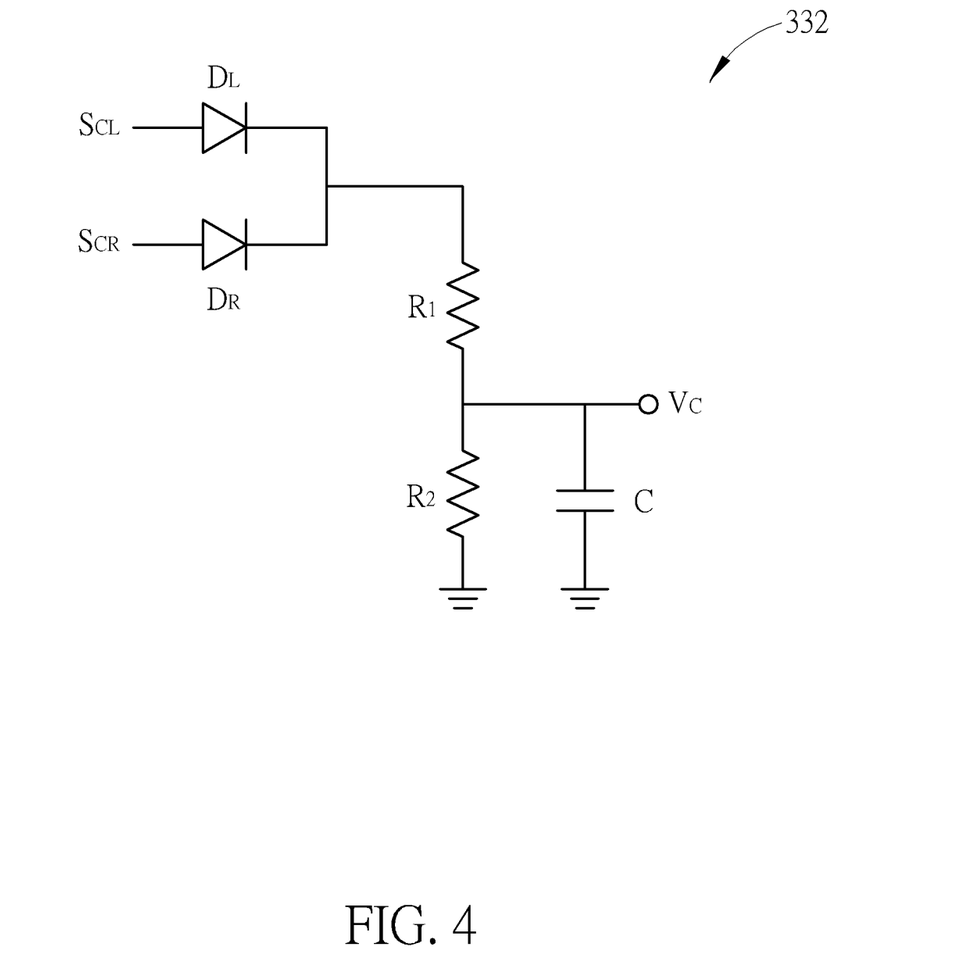
FIG. 4 is a diagram illustrating a part of circuit elements of the controller shown in FIG. 3 according to an embodiment of the present invention.

Moreover, as long as the control circuit 330 shown in FIG. 3 may detect the control signal $S_C$ to adjust the reference power $V_{CMD}$ to thereby adjust the duty cycle of the control signal $S_C$, it is possible to employ other circuit architectures to implement the control circuit 330. For example, the control circuit 330 may store a relation table associated with the input power $V_{PV}$, the reference power $V_{CMD}$ and the duty cycle of the control signal $S_C$. Hence, the control circuit 330 may select a voltage level of the reference power $V_{CMD}$ according to the detection result DR.

It should be noted that the above control mechanism of the inverter apparatus 300 shown in FIG. 3 may be employed in the inverter apparatus 100 shown in FIG. 1. To sum up, the proposed inverter apparatus may obtain/monitor an operating status by detecting a control signal of a primary-side conversion circuit, and adaptively adjust a signal level and/or a duty cycle of the control signal. Hence, the proposed inverter apparatus may maintain a stable operation in a burst mode and can be used in a variety of power conversion schemes.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An inverter apparatus, comprising:
   a direct current to direct current (DC/DC) converter, arranged for converting an input power to a DC power according to a control signal;
   a direct current to alternating current (DC/AC) converter, coupled to the DC/DC converter, the DC/AC converter arranged for receiving the DC power, and generating an AC power according to the DC power; and
   a control circuit, coupled to the DC/DC converter, the control circuit arranged for receiving the input power to be converted, comparing a reference power with the received input power to generate the control signal so as to control an operation of the DC/DC converter, detecting the control signal to generate a detection result, and selectively adjusting the reference power according to the detection result so as to adjust a duty cycle of the control signal according to the adjusted reference power;
   wherein when the DC/DC converter operating in a normal mode is switched to a burst mode to deactivate power conversion, the reference power is maintained at a first voltage level; and when the control circuit refers to the detection result to adjust the reference power from the first voltage level to a second voltage level different from the first voltage level, the DC/DC converter operating in the burst mode is switched to the normal mode to activate the power conversion.

2. The inverter apparatus of claim 1, wherein the control signal has a first level and a second level different from the first level; and when the DC/DC converter operates in the burst mode according to the control signal, the control signal continuously stays at the second level, and the control circuit detects a duration during which the control signal continuously stays at the second level to generate the detection result.

3. The inverter apparatus of claim 2, wherein when the detection result indicates that the control signal continuously stays at the second level over a specific period of time, the control circuit adjusts the reference power from the first voltage level to the second voltage level.

4. The inverter apparatus of claim 1, wherein the control circuit compares a voltage level of the input power with a voltage level of the reference power to generate a comparison result, and generates the control signal according to the comparison result.

5. The inverter apparatus of claim 4, wherein when the comparison result indicates that the voltage level of the input power is less than the voltage level of the reference power, the DC/DC converter operates in the burst mode according to the control signal.

6. The inverter apparatus of claim 4, wherein the control circuit adjusts the voltage level of the reference power according to the detection result so as to adjust the duty cycle of the control signal.

7. The inverter apparatus of claim 6, wherein the control signal has a first level and a second level different from the first level; when the DC/DC converter operates in the burst mode according to the control signal, the control signal continuously stays at the second level; and when the detection result indicates that the control signal continuously stays at the second level over a specific period of time, the control circuit reduces the voltage level of the reference power so as to adjust the reference power from the first voltage level to the second voltage level.

8. The inverter apparatus of claim 7, wherein the control circuit reduces the voltage level of the reference power until the control signal is switched from the second level to the first level.

9. A control method for an inverter apparatus, the inverter apparatus comprising a direct current to direct current (DC/DC) converter and a direct current to alternating current (DC/AC) converter, the DC/DC converter converting an input power to a DC power, the DC/AC converter converting the DC power to an AC power, the control method comprising:
   comparing a reference power with the input power to generate the control signal so as to control an operation of the DC/DC converter;
   detecting the control signal to generate a detection result; and
   selectively adjusting the reference power according to the detection result so as to adjust a duty cycle of the control signal according to the adjusted reference power;
   wherein when the DC/DC converter operating in a normal mode is switched to a burst mode to deactivate power conversion, the reference power is maintained at a first voltage level; and when reference power is adjusted from the first voltage level to a second voltage level different from the first voltage level according to the detection result, the DC/DC converter operating in the burst mode is switched to the normal mode to activate the power conversion.

10. The control method of claim 9, wherein the step of comparing the reference power with the input power to generate the control signal comprises:
   comparing a voltage level of the input power with a voltage level of the reference power to generate a comparison result; and
   generating the control signal according to the comparison result.

11. The control method of claim 10, wherein when the comparison result indicates that the voltage level of the input power is less than the voltage level of the reference power, the DC/DC converter operates in the burst mode according to the control signal.

12. The control method of claim 9, wherein the step of selectively adjusting the reference power according to the detection result so as to adjust the duty cycle of the control signal comprises:
   selectively adjusting the voltage level of the reference power according to the detection result so as to adjust the duty cycle of the control signal.

13. The control method of claim 12, wherein the control signal has a first level and a second level different from the first level; when the DC/DC converter operates in the burst mode according to the control signal, the control signal continuously stays at the second level; and when the detection result indicates that the control continuously signal stays at the second level over a specific period of time, the step of selectively adjusting the voltage level of the reference power according to the detection result comprises:
   reducing the voltage level of the reference power so as to adjust the reference power from the first voltage level to the second voltage level.

14. The control method of claim 13, wherein the step of reducing the voltage level of the reference power comprises:
   reducing the voltage level of the reference power until the control signal is switched from the second level to the first level.

* * * * *